US012564826B2

(12) United States Patent (10) Patent No.: US 12,564,826 B2
Vedder (45) Date of Patent: Mar. 3, 2026

---

(54) FILTER MATERIAL FOR WATER TREATMENT

(71) Applicant: Lhoist Recherche et Développement S.A., Ottignies-Louvain-la-Neuve (BE)

(72) Inventor: Heidrun Vedder, Blankenheim (DE)

(73) Assignee: LHOIST RECHERCHE ET DEVELOPPEMENT S.A., Ottignies-Louvain-la-Neuve (BE)

( * ) Notice: Subject to any disclaimer, the term of this patent is extended or adjusted under 35 U.S.C. 154(b) by 924 days.

(21) Appl. No.: 17/631,690

(22) PCT Filed: Jul. 29, 2020

(86) PCT No.: PCT/EP2020/071354
§ 371 (c)(1),
(2) Date: Jul. 25, 2022

(87) PCT Pub. No.: WO2021/018942
PCT Pub. Date: Feb. 4, 2021

(65) Prior Publication Data
US 2022/0387963 A1 Dec. 8, 2022

(30) Foreign Application Priority Data
Jul. 31, 2019 (DE) ..................... 10 2019 120 629.4

(51) Int. Cl.
B01J 20/04 (2006.01)
B01J 20/28 (2006.01)
(Continued)

(52) U.S. Cl.
CPC ........... B01J 20/043 (2013.01); B01J 20/041 (2013.01); B01J 20/28004 (2013.01);
(Continued)

(58) Field of Classification Search
CPC .. B01J 20/041; B01J 20/043; B01J 20/28004; B01J 20/28011; B01J 20/28019;
(Continued)

(56) References Cited

U.S. PATENT DOCUMENTS 6,322,705 B1 11/2001 Stornes
10,046,992 B2 8/2018 Skovby
(Continued)

FOREIGN PATENT DOCUMENTS

CN 103080021 A 5/2013
CN 104478260 4/2015
(Continued)

OTHER PUBLICATIONS

Anonymous, "A Dutch solution for magnesia", Nov. 1, 2004, XP055637694, Retrieved from the Internet: URL:http://www.indmin. com/pdfs/697/67023/cd200411062.pdf, the whole document.
(Continued)

*Primary Examiner* — Dirk R Bass
(74) *Attorney, Agent, or Firm* — Honigman LLP; Andrew N. Weber; Jonathan P. O'Brien

(57) ABSTRACT

A first filter material for water treatment comprising a first granulate containing calcium carbonate and a second granulate containing magnesium oxide, wherein the first and the second granulate each independently having a bulk density of 1.00 to 1.40 t/m³; a second filter material for water treatment comprising 55 to 85 wt. % of a first granulate containing calcium carbonate and 15 to 45 wt. % of a second granulate containing magnesium oxide, in each case based on the sum of the amounts of the first and the second granulate; a method for manufacturing the filter material; a filter containing the filter material; a use of the filter material for treating water; and a water treatment method are described.

15 Claims, 1 Drawing Sheet

(51) Int. Cl.

| | |
|---|---|
| *B01J 20/30* | (2006.01) |
| *C02F 1/28* | (2023.01) |
| *C02F 1/66* | (2023.01) |
| *C02F 1/68* | (2023.01) |

(52) U.S. Cl.
CPC ... *B01J 20/28011* (2013.01); *B01J 20/28019* (2013.01); *B01J 20/28052* (2013.01); *B01J 20/3028* (2013.01); *C02F 1/281* (2013.01); *C02F 1/66* (2013.01); *C02F 1/688* (2013.01); *B01J 2220/42* (2013.01)

(58) Field of Classification Search
CPC .............. B01J 20/28052; B01J 20/3028; B01J 2220/42; C02F 1/281; C02F 1/66; C02F 1/688
See application file for complete search history.

(56) References Cited

U.S. PATENT DOCUMENTS

| | | | |
|---|---|---|---|
| 2016/0115076 A1 | 4/2016 | Criniere et al. | |
| 2016/0288085 A1* | 10/2016 | Itaya ......................... | B09C 1/08 |
| 2021/0178357 A1 | 6/2021 | Fischer | |

FOREIGN PATENT DOCUMENTS

| | | |
|---|---|---|
| CN | 104591441 A | 5/2015 |
| CN | 107857315 A | 3/2018 |
| DE | 102004049020 A1 | 4/2006 |
| GB | 1384756 A | 2/1975 |
| JP | 2003251371 A | 9/2003 |
| JP | 10-2016-0013064 | 1/2015 |
| KR | 20140104594 A | 8/2014 |
| WO | 2013/046232 | 4/2013 |
| WO | 2015/122772 | 8/2015 |
| WO | 2016/146566 | 9/2016 |
| WO | 2020/007869 | 1/2020 |
| WO | 2021/018942 | 2/2021 |

OTHER PUBLICATIONS

International Preliminary Report on Patentability from PCT/EP2019/067755 completed Nov. 1, 2004.
International Search Report and Written Opinion of the International Searching Authority from PCT/EP2019/067755 mailed Jul. 11, 2019.
PCT Demand for International Preliminary Examination (Chapter II) Response to Written Opinion dated Apr. 29, 2020.
Response to Written Opinion of the International Preliminary Examining Authority dated Aug. 3, 2020.
Written Opinion of the International Preliminary Examining Authority mailed Jun. 3, 2020.
International Search Report and Written Opinion of the International Searching Authority from PCT/EP2020/071354 mailed Feb. 4, 2021.
Chilean Office Action, Application No. 2022-000222, dated Jun. 22, 2023.

\* cited by examiner

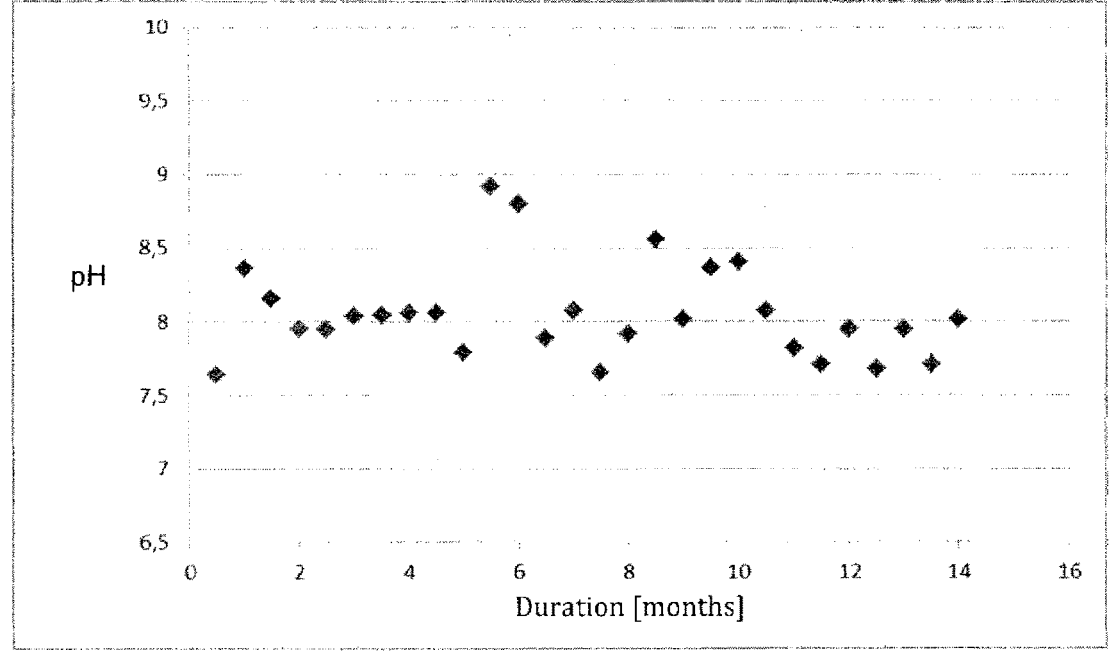

FILTER MATERIAL FOR WATER TREATMENT

The invention relates to a first filter material for water treatment, a second filter material for water treatment, a method for producing the filter material, a filter comprising a filter material, the use of a filter material, and a water treatment method.

When drinking water is treated, filter materials that usually contain mineral constituents are used to deacidify the water. Filter materials that contain calcium carbonate and/or magnesium oxide are of particular importance here. Half-burnt dolomite, which is formed when dolomite is burned, also belongs to this group of filter materials.

Half-burnt dolomite largely consists of calcium carbonate and magnesium oxide. Granulates made of half-burnt dolomite have particularly good deacidification properties when treating drinking water. While granulate based on calcium carbonate is not reactive enough for certain applications in water treatment, granulate based on magnesium oxide can be too reactive for some applications, with the result that the pH value of the water exceeds a value acceptable for drinking water. Granulate made from half-burnt dolomite, on the other hand, has an excellent reactivity profile resulting from the advantageous interaction of the various components.

In addition, filter materials made from half-burnt dolomite also meet the high safety and quality requirements that must be satisfied when treating drinking water. These requirements are regulated in the "Ordinance on the Quality of Water for Human Consumption (Drinking Water Ordinance—TrinkwV)." According to the Drinking Water Ordinance, only a few substances are permitted for deacidification and adjusting the pH of drinking water.

One disadvantage of granulate made from half-burnt dolomite, however, is that it must be made from dolomite stone in complicated, time-consuming, and energy-consuming manufacturing processes. For processing, ground half-burnt dolomite is mixed with dolomite hydrate, granulated and recarbonated. Producing granulate from half-burnt dolomite is thus a complex, time-consuming, labor-intensive, and energy-intensive process.

A further disadvantage of granulate made from half-burnt dolomite is that further "fine-tuning" in the pH adjustment of the water is not possible in a simple way. The ratio of magnesium oxide to calcium carbonate is already specified in the raw dolomite. Any further addition of magnesium oxide and/or calcium carbonate in the process for producing the half-burnt dolomite must be precisely coordinated, as this can have a negative impact on the granulation behavior of the material.

Other filter materials that comprise calcium carbonate and magnesium oxide are already known. However, these do not have the excellent deacidification properties of half-burnt dolomite.

DE 1 592 133 A1, for example, describes a granular filter material for deacidifying water which consists mainly of calcium compounds, the core of the filter particle substantially consisting of calcium hydroxide and the shell substantially consisting of porous calcium carbonate. The core of the filter particle can also contain magnesium oxide. Due to the relatively high proportion of calcium hydroxide, the granular filter material according to DE 1 592 133 A1 has a deacidification behavior that differs from the reactivity profile of half-burnt dolomite.

As a result, there is still a need for new filter materials that have excellent deacidification properties for drinking water treatment similar to granulate made from half-burnt dolomite. In addition, such filter materials would have to ensure that the treated water satisfies the high requirements of the Drinking Water Ordinance.

The object of the present invention is therefore to provide a filter material suitable for treating drinking water. The filter material should have deacidification properties similar to granulate made from half-burnt dolomite.

In addition, the object of the invention is to provide a filter material with which water can be treated such that it meets the high quality requirements of the Drinking Water Ordinance. In particular, the object of the invention is to provide a filter material which, during water treatment, ensures that the water does not exceed the 9.5 pH limit value of the Drinking Water Ordinance. Furthermore, the filter material should also satisfy the requirements for treatment materials in the Drinking Water Ordinance.

A further object of the present invention is to provide a filter material which can be produced in a simple and inexpensive manner.

Finally, the object of the present invention is to provide a filter with which high-quality and stable water deacidification is possible over several months.

One or more of these objects are achieved by the products described herein.

Advantageous embodiments of the invention are explained in detail below.

The present invention relates to a first filter material for water treatment comprising a first granulate containing calcium carbonate and a second granulate containing magnesium oxide, wherein the first and the second granulate each independently have a bulk density of 1.00 to 1.40 t/m³.

Surprisingly, it has been shown that such a filter material is extremely well suited for treating water, in particular drinking water. It is also possible to precisely adjust the pH of drinking water with the inventive filter material.

The deacidification behavior of the inventive filter material comes very close to that of granulates made from half-burnt dolomite and remains stable even over several weeks with a daily running time of just under 10 hours. Uniform deacidification of the drinking water is assured with the inventive filter material. Water treated with the inventive filter material satisfies the quality requirements of the Drinking Water Ordinance and does not exceed the pH limit of 9.5. During water treatment, the filter material also leads to iron removal and manganese removal and to remineralization of the drinking water, which further improves the quality of the drinking water. Without wanting to be bound by a specific scientific theory, the excellent deacidification behavior of the filter material seems to be due to the interaction between the first granulate and second granulate. The inventive filter material behaves like granulate made from half-burnt dolomite, although it comprises a different type of granulate. This homogeneous deacidification behavior seems to be due in particular to the corresponding bulk density of the first and the second granulate. If both the first and the second granulate each independently have a bulk density of 1.00 to 1.40 t/m³, the filter material results in a homogeneous mixture of the two granulates, which mixture does not significantly change its distribution even over a lengthy period of time under the influence of water. In this way, there is no segregation in the filter and the filter material has a stable ratio of first and second granulate over the entire filter.

Granulates in the context of the invention comprise grains, each grain being an agglomerate of smaller particles. Consequently, pure powders are not granulates for the purposes of the invention.

With a bulk density of less than 1.00 t/m³ for the first and/or second granulate, the granulates are not sufficiently stable to react uniformly even when large amounts of water are used in industrial water treatment. There can be separations and irregularities with such granulates. On the other hand, if the first and/or the second granulate has a bulk density of greater than 1.40 t/m³, the particles from which the grains of the granulate are formed do not form a loose bond with one another, but instead are packed too tightly, resulting in an unstable granulate. Granulates obtained in this way are not sufficiently stable for applications in the industrial water treatment of drinking water and do not have the necessary reactivity for the deacidification process.

According to one advantageous embodiment of the inventive filter material, the first and/or the second granulate each independently has a bulk density of 1.10 to 1.38 t/m³, preferably 1.15 to 1.35 t/m³, or particularly preferably 1.20 to 1.32 t/m³. If the first and/or the second granulate has such a bulk density, it is possible to achieve a particularly constant pH adjustment of drinking water with the filter material.

According to one particularly preferred embodiment of the invention, both the first and the second granulate have a bulk density of 1.10 to 1.38 t/m³, more preferably 1.15 to 1.35 t/m³, or particularly preferably 1.20 to 1.32 t/m³. The more similar the bulk densities of the first and the second granulate of the filter material, the more uniform and stable the effectiveness of the filter material during water treatment. The bulk density of the first granulate is particularly preferably at most 20%, in particular at most 10% or at most 5% above or below the bulk density of the second granulate, in relation to the value of the bulk density of the first and the second granulate in t/m³. This means, for example, that if the bulk densities of the first and the second granulate differ by at most 10% and the second granulate has a bulk density of 1.15 t/m³, the first granulate has a bulk density of 1.04 to 1.26 t/m³. Methods for determining the bulk density are known to a person skilled in the art. In particular, the bulk density of the inventive granulate is determined in accordance with the DIN EN 12902, Section 5.2, particularly preferably in accordance with DIN EN 12902:2004, Section 5.2. The inventive granulates are granular material within the meaning of Table 1 in Section 5.2.4 of DIN EN 129022004.

The deacidification behavior of the inventive filter material has proven to be particularly effective and constant when the filter material contains the first granulate in an amount of 55 to 85% by weight, preferably in an amount of 60 to 80% by weight, more preferably in an amount of 62 to 75% by weight, more preferably in an amount of 65 to 70% by weight, or particularly preferably in an amount of 66 to 68% by weight, based on the sum of the amounts of the first and the second granulate. If the filter material contains the first and the second granulates in such a ratio, the deacidification behavior of the inventive filter material corresponds in particular to that of granulates made from half-burnt dolomite. In addition, in this case the filter material has a stable deacidification behavior for a particularly long period of time.

Particularly good results in water treatment can be achieved if the first granulate of the filter material contains calcium carbonate in an amount of at least 90% by weight, preferably at least 93% by weight, more preferably at least 95% by weight, or particularly preferably at least 96% by weight, based on the total dry weight of the first granulate. According to one particularly preferred embodiment of the invention, the first granulate contains calcium carbonate in an amount of approximately 97% by weight, based on the total dry weight of the first granulate. According to one further embodiment, the first granulate contains calcium carbonate in an amount of at least 97% by weight, at least 98% by weight, or at least 99% by weight, based on the total dry weight of the first granulate. According to one further particularly preferred embodiment of the invention, the first granulate satisfies the purity criteria for calcium carbonate according to DIN EN 1018:2013, Section 5. With such a high proportion of calcium carbonate in the first granulate, it is ensured that the quality of the water treatment remains stable over a large number of water runs. In addition, a filter material in which the first granulate contains such an amount of calcium carbonate has a particularly high deacidification potential. With a first granulate having the stated calcium carbonate proportions and the stated calcium carbonate purity, the treated water also has particularly low turbidity of less than 2 NTU, preferably less than 1.5 NTU, or particularly preferably less than 1 NTU.

According to one further preferred embodiment of the invention, the second granulate of the filter material contains magnesium oxide in an amount of at least 80% by weight, preferably at least 85% by weight, or particularly preferably at least 90% by weight, based on the total dry weight of the second granulate. According to one further embodiment of the invention, the second granulate contains magnesium oxide in an amount of at least 93% by weight, at least 95% by weight, at least 97% by weight, at least 98% by weight, or at least 99% by weight, based on the total dry weight of the second granulate. According to one particularly preferred embodiment of the invention, the second granulate preferably has a magnesium oxide purity in accordance with the requirements of DIN EN 16004:2012-02, Section 4. If the second granulate has such a proportion of magnesium oxide, the pH of water can be adjusted particularly efficiently. In addition, the pH of the water can also be adjusted particularly precisely with such a filter material. With a second granulate having the stated magnesium oxide proportions and the stated magnesium oxide purity, the treated water also has particularly low turbidity of less than 2 NTU, preferably less than 1.5 NTU, or particularly preferably less than 1 NTU.

Methods for determining the turbidity of a water sample are known to the person skilled in the art. The turbidity of the water sample can be determined in particular by means of nephelometry. In particular, the method in accordance with DIN EN ISO 7027:2000 can be used for this purpose.

The first granulate can also contain other components in addition to calcium carbonate. It has been found to be particularly advantageous if the first granulate has magnesium oxide in an amount of at most 1% by weight, in particular at most 0.5% by weight, based on the total dry weight of the first granulate. The pH of the treated water can be precisely adjusted and predicted if the first granulate contains only these small amounts of magnesium oxide. With significantly higher amounts of magnesium oxide in the first granulate (for example, greater than 10% by weight), there may be brief and/or short-term increases in the pH (peaks), which are undesirable in water processing.

According to one embodiment, the first granulate contains magnesium carbonate, preferably from 0.01 to 2.0% by weight, free calcium oxide, preferably from 0.1 to 2.0% by weight, iron and aluminum oxide, preferably together from 0.01 to 0.5% by weight, and/or silicic acid, preferably from 0.05 to 0.5% by weight, in each case based on the total dry weight of the first granulate. Granulates with some or all of these additional components are comparatively inexpensive and at the same time have excellent water treatment quality.

The second granulate can contain other components in addition to magnesium oxide. According to one embodiment of the invention, the second granulate contains calcium carbonate in an amount of at most 3% by weight, in particular at most 2% by weight, at most 1% by weight, or at most 0.5% by weight, based on the total dry weight of the second granulate. This ensures that the second granulate has a high deacidification potential.

According to one embodiment, the second granulate contains as further components free calcium oxide, preferably from 0.1 to 2.0% by weight, iron and aluminum oxide, preferably together from 0.1 to 2.0% by weight, and/or silicic acid, preferably from 0.05 to 2.0% by weight, in each case based on the total dry weight of the second granulate. Granulates with some or all of these additional components are comparatively inexpensive and at the same time have excellent water treatment quality.

Unless otherwise stated, the calcium carbonate content and purity is determined in accordance with DIN 12485, in particular in accordance with DIN EN 12485:2017-10.

Unless otherwise stated, the content of magnesium oxide in the dry substance is determined in particular according to DIN EN 12485, in particular according to DIN EN 12485:2017-10, Item 6.9.

When determining the content of a substance according to one of the analytical methods listed in DIN EN 12485, in particular DIN EN 12485:2017-10, it should be noted that the analytical methods are to be carried out on material which is obtained after determining the ignition loss at 550° C. At this temperature, calcium hydroxide is converted to calcium oxide, for example. Likewise, magnesium hydroxide is converted to magnesium oxide at this temperature. Thus, in the determination of the magnesium oxide content in the dry substance according to DIN EN 12485, in particular according to DIN EN 12485:2017-10, Item 6.9, both the magnesium oxide contained in the material before the ignition loss and the magnesium hydroxide are equally detected as magnesium oxide in the dry substance. Magnesium oxide in the dry substance thus includes, in particular, magnesium oxide and magnesium hydroxide contained in the sample before the ignition loss. Similarly, in the determination of the free calcium oxide according to DIN EN 12485, in particular according to DIN EN 12485:2017-10, Item 6.8, both the calcium oxide contained in the material before the ignition loss and the calcium hydroxide are equally determined as free calcium oxide. Free calcium oxide thus includes, in particular, calcium oxide and calcium hydroxide contained in the sample before the ignition loss.

In principle, the first and/or second granulate can be present in very different shapes. For example, the first and/or second granulate can have a cylindrical shape, a spherical shape, a lenticular shape, a rectangular shape, a cube shape, or a prismatic shape. If the first and the second granulate are each independently a substantially spherical granulate, the filter material can be introduced into the filter in a particularly uniform and space-saving manner. In addition, the degradation of the spherical granulate occurs particularly uniformly in the course of the deacidification process, so that the filter material still provides a uniform and stable water treatment result even after a lengthy period of action.

According to one particularly preferred embodiment, both the first granulate and the second granulate are a substantially spherical granulate.

In principle, the size of the first granulate for the inventive filter material can be in a wide range. It has been found to be particularly advantageous if the first granulate has a particle size range of 0.01 to 8 mm, preferably 0.1 to 6 mm, more preferably 0.3 to 4, or particularly preferably 0.5 to 3.2 mm, with an undersize percentage of less than 10% by weight, preferably a maximum of 2% by weight, and with an oversize percentage of less than 10% by weight, preferably a maximum of 7% by weight. If the first granulate has such a particle size range, there is an optimal surface-to-volume ratio for treating water. In addition, with this size for the first granulate, the water can easily pass through the filter material in the filter and at the same time interact sufficiently with the to ensure complete treatment of the water.

The size of the second granulate can be selected within a wide range. It has been found to be particularly advantageous for the filter material if the second granulate has a particle size range of 0.01 to 12 mm, preferably 0.1 to 10 mm, more preferably 0.2 to 5 mm, or particularly preferably 0.5 up to 2.5 mm, with an undersize percentage of less than 10% by weight, preferably a maximum of 3% by weight, and with an oversize percentage of less than 10% by weight, preferably a maximum of 9% by weight. With this particle size range, the reactivity behavior of the second granulate with respect to water is particularly advantageous. in addition, with this size for the second granulate, the water can easily pass through the filter material in the filter and at the same time interact sufficiently with the granulate to ensure complete treatment of the water.

A particle size range in accordance with DIN EN 12901: 1999 includes all particle sizes between two sieve apertures, the particle size range being designated by these apertures with the maximum particle size and minimum particle size. The maximum particle size is the maximum sieve aperture when analysing a particle size distribution and the minimum particle size is the minimum sieve aperture when analysing a particle sieze distribution. The oversize percentage corresponds to the percentage by mass (% (m/m)) of a particulate mixture which does not pass the test sieve with the larger aperture used for the respective particle fraction. The undersize percentage corresponds to the percentage by mass (% (m/m)) of a mixture which passes the test sieve with the smaller aperture used for the respective fraction.

Methods for measuring the particle size range are known to the person skilled in the art. The particle size range can be determined in particular by means of sieving experiments.

According to one further embodiment of the invention, the inventive filter material has reactivity such that raw water is treated using treatment with the inventive filter material within an EBCT value (Empty Bed Contact Time; at 10° C.) of less than 20 minutes, preferably less than 15 minutes, more preferably less than 12 minutes, especially preferably less than 10 minutes, such that the water subsequently has a calcite dissolving capacity of less than 5 mg/l.

The raw water which is treated using treatment with shaped bodies according to the invention preferably has a water temperature of about 5 to 15° C., a pH of less than or equal to 7.25, a base capacity up to pH 8.2 ($K_{B\,8.2}$) greater than or equal to 0.2 mmol/l, and an acid capacity up to pH 4.3 ($K_{S\,4.3}$) greater than or equal to 0.5 mmol/l. The stated EBCT value is preferably achieved with an open filter having a filter material layer thickness of 1000 to 2000 mm. The filter speed is advantageously 10 m/h.

The calcite dissolving capacity is calculated in particular according to DIN 38404 C 10, preferably according to DIN 38404-10:2012-12 (Title: German Standard Methods for Water, Wastewater and Sludge Examination—Physical and Physical-Chemical Substance Characteristics (Group C)—Part 10: Calculation of Calcite Saturation of Water (C 10)).

In particular, the EBCT value describes a measure of the time that a raw water to be treated is in contact with the treatment medium in a container, assuming that all the raw water flows through the container at the same rate. The EBCT value can be calculated as the quotient of the volume of the particles of the treatment medium divided by the volumetric flow rate.

According to one preferred embodiment of the invention, the inventive filter material substantially consists of the first granulate containing calcium carbonate and the second granulate containing magnesium oxide. When it is stated herein that the filter material substantially consists of the first and the second granulate, this means that the amount of first granulate and second granulate together is at least 95% by weight, preferably at least 98% by weight, based on the total dry weight of the filter material.

According to one further preferred embodiment of the invention, the inventive filter material consists of the first granulate containing calcium carbonate and the second granulate containing magnesium oxide.

According to one further embodiment of the invention, the inventive filter material consists of a first granulate, which substantially consists of calcium carbonate, and a second granulate, which substantially consists of magnesium oxide. When it is stated herein that the first granulate substantially consists of calcium carbonate, this means that the amount of calcium carbonate in the first granulate is at least 95% by weight, in particular at least 97% by weight, more preferably at least 98% by weight, or particularly preferably at least 99% by weight, based on the total dry weight of the first granulate. When it is stated herein that the second granulate substantially consists of magnesium oxide, this means that the amount of magnesium oxide in the second granulate is at least 95% by weight, in particular at least 97% by weight, more preferably at least 98% by weight, or particularly preferably at least 99% by weight, based on the total dry weight of the second granulate. Even more preferably, the first and/or second granulate consists of calcium carbonate or magnesium oxide.

The invention furthermore relates to a second filter material for water treatment which contains 55 to 85% by weight of a first granulate containing calcium carbonate and 15 to 45% by weight of a second granulate containing magnesium oxide, in each case based on the sum of the amounts of the first and the second granulates. This second filter material is ideally suited for treating water and during water treatment behaves very similarly to granulates made of half-burnt dolomite.

According to one preferred embodiment, the first and the second granulate each independently has a bulk density of 1.00 to 1.40 t/m$^3$. With such a bulk density, the second filter material in particular does not cause any segregation effects in the filter. What was stated about the first granulate in connection with the first inventive filter material also applies equally to the first granulate of the second inventive filter material.

What was stated about the second granulate in connection with the first inventive filter material also applies equally to the second granulate of the second inventive filter material.

The invention also relates to a method for producing an inventive filter material. The inventive method for producing an inventive filter material comprises at least the steps:

a. Providing a first granulate containing calcium carbonate and a second granulate containing magnesium oxide, wherein the first and the second granulate each independently have a bulk density of 1.00 to 1.40 t/m$^3$;

b. Mixing the first and the second granulate to produce the filter material.

A homogeneous and well-mixed filter material can be obtained with the inventive method.

According to one preferred embodiment of the inventive method, the mixing takes place in method step b. in a mixer selected from the group consisting of a rotatable drum mixer, a trough mixer, a pan mixer, and a mechanical agitation mixer. A particularly homogeneous filter material can be obtained with the aforesaid mixers. The rotatable drum mixer has proven to be particularly well suited for mixing the first and the second granulate.

What was stated about the first granulate in connection with the first inventive filter material also applies equally to the first granulate of the inventive method for producing the filter material.

What was stated about the second granulate in connection with the first inventive filter material also applies equally to the second granulate of the inventive method for producing the filter material.

The invention furthermore relates to a filter containing the inventive filter material.

According to one preferred embodiment of the inventive filter, the filter comprises at least a first layer and a second layer, the first layer comprising a filler material and the second layer comprising the inventive filter material. In this way particularly economical water treatment is made possible. In addition, the filler material layer ensures that the filter material layer is particularly stable and is not stirred up.

In principle, all common fillers known to the person skilled in the art can be used as filler material. Filler material selected from supporting gravel, sand, kieselgur, silica gel, molecular sieve, zeolite, cellulose, cellulose derivatives, carbon fibers, ceramic, synthetic resin, rock flour, glass fiber, silicates, glass spheres, and mixtures thereof have proven to be particularly suitable. These filler materials have excellent properties for use in a filter for treating drinking water.

According to one preferred embodiment of the inventive filter, the filler material has a particle size range of 0.1 to 12 mm, preferably 0.5 to 10 mm, more preferably 1 to 8 mm, or particularly preferably 2 to 6 mm, with an undersize percentage of less than 15% by weight, preferably of a maximum of 10% by weight, and an oversize percentage of less than 15% by weight, preferably of a maximum of 10% by weight. Filler materials having such a particle size range have proven to be particularly suitable materials for use in filters for drinking water treatment. With such a particle size range, the water can flow evenly and constantly through the filler material.

According to one further preferred embodiment of the invention, the filter has a diameter of 100 to 3500 mm and/or a height of 500 to 10000 mm. A filter having a diameter of 200 to 2000 mm has proven to be particularly well suited for water treatment. A particularly preferred height of the filter is 2000 to 4000 mm. With these dimensions, the filter is particularly well suited for drinking water treatment and can ensure time-saving and cost-effective water treatment.

What was stated about the first granulate in connection with the first inventive filter material also applies equally to the first granulate of the filter material contained in the inventive filter.

What was stated about the second granulate in connection with the first inventive filter material also applies equally to the second granulate of the filter material contained in the inventive filter.

The invention furthermore relates to the use of the inventive filter material for treating water, preferably for deacidifying and/or remineralizing water. Use of the inventive filter material for deacidifying and/or remineralizing drinking water is particularly preferred.

In addition, the invention relates to the use of the inventive filter for treatment of water, preferably for deacidification and/or remineralization of water. The use of the inventive filter for deacidification and/or remineralization of water is particularly preferred.

What was stated about the first granulate in connection with the first inventive filter material also applies equally to the first granulate of the filter material of the inventive uses.

What was stated about the second granulate in connection with the first inventive filter material also applies equally to the second granulate of the filter material of the inventive uses.

The invention furthermore relates to a water treatment method, in particular for treating drinking water, comprising at least the steps:

a. Providing a filter containing a filter material which comprises a first granulate containing calcium carbonate and a second granulate containing magnesium oxide, wherein the first and the second granulate each independently have a bulk density of 1.00 to 1.40 t/m³;

b. Introducing water into the filter;

c. Bringing the introduced water into contact with the filter material;

d. Removing the water previously brought into contact with the filter material from the filter.

According to one preferred embodiment of the inventive water treatment method, the water is brought through the filter at a speed of 5 to 30 m/h, preferably 8 to 20 m/h or particularly preferably 10 to 15 m/h. In this way, a particularly efficient water treatment process can be used that provides treated water of excellent quality.

According to one further preferred embodiment, the contact time the water has with the filter material in method step c is from 1 to 30 minutes, preferably from 5 to 15 minutes, or particularly preferably from 6 to 10 minutes. This contact time has proven to be sufficient for the water treatment and at the same time enables a high water throughput.

According to one further preferred embodiment of the inventive water treatment method, filter material is refilled into the filter after 5 to 15%, in particular 8 to 10%, of the filter material volume required for the treatment target, i.e. the filter material originally introduced into the filter, has been used up. The refill volume of filter material is preferably calculated from the difference between the filter material volume required for the treatment target and the volume of the filter material in the filter at the time of refilling. In this way long-term stable water treatment is guaranteed.

In order to prevent the filter from silting up due to impurities from the raw water, flushing the filter containing the inventive filter material has been found to be advantageous according to one preferred embodiment. According to one embodiment, before being brought into contact with water in method step b., the filter is flushed for 1 to 30 minutes, preferably for about 10 minutes, with an air-water mixture and finally with water.

What was stated about the filter material in connection with the first inventive filter material also applies equally to the filter material used in the inventive water treatment method.

What was stated about the first granulate in connection with the first inventive filter material also applies equally to the first granulate of the inventive water treatment method.

What was stated about the second granulate in connection with the first inventive filter material also applies equally to the second granulate of the inventive water treatment method.

The invention is explained in more detail below by means of an example, which, however, is only used for illustrative purposes and is not limiting.

EXAMPLE

FIG. 1 shows the pH value of water which has been treated with the inventive filter material A filter having a diameter of 300 mm and a height of 3000 mm was initially filled with 34 kg support gravel (height 300 mm) as filler material with a particle size range of 2.0 to 3.15 mm (oversize and undersize percentage less than 10% by weight). Then 40 kg filter material (height 500 mm) was poured into the filter. The filter material was made of 26.7 kg of a first granulate (Akdolit® Hydro-Calcit C G) containing approximately 97% by weight calcium carbonate, based on the dry weight of the first granulate, and 13.3 kg of a second granulate (Akdolit® Hydrolit-MG) containing approximately 95% by weight magnesium oxide, based on the dry weight of the second granulate.

The filled filter was then flushed with raw water for 10 minutes in order to prevent the filter from silting up.

Then raw water having a temperature of about 9° C., a pH value of about 7.25, a base capacity up to pH 8.2 ($K_{B\ 8.2}$) of 0.2 mmol/l and an acid capacity up to pH 4.3 ($K_{S\ 4.3}$) of 1.6 mmol/l was pumped through the filter at a water flow rate of 0.3 to 0.6 m³/h. The daily running time was 5 to 10 hours. After a treatment volume of about 100 m³ of water, 10 kg of the filter material described above was added to the filter material already introduced into the filter. The filled filter was then flushed again for about 10 minutes as described above.

After a 600 m³ total treatment volume of water, the filter was emptied and refilled with fresh support gravel (10 kg, particle size range 3.15 to 5.6 mm, oversize and undersize percentage content less than 10% by weight; height in the filter 300 mm) and fresh filter material (19.5 kg total; 13 kg Akdolit® Hydro-Calcit C G and 6.5 kg Akdolit® Hydrolit-Mg) and flushed with raw water for 6 minutes. The raw water was then pumped through the filter again at a water flow rate of 0.3 to 0.6 m³/h for 5 to 10 hours daily. Refilling took place when the filtrate fell below the treatment target of pH 7.7.

The treated water was checked regularly for pH, hardening, and turbidity. As can be seen from FIG. 1, the pH of the treated water was between 7.5 and 9 over the entire duration and thus clearly distanced from the lower and upper limit values for drinking water according to the Drinking Water Ordinance. The filter material in the filter remained sufficiently active for deacidifying the water even over a period of several months. At the same time, the activity of the filter material was never too high, but remained stable over the entire test period. In addition, no significant fluctuations in the pH value could be observed.

The water was checked for hardening at regular intervals (approximately every two weeks). The values for calcium and magnesium ions were determined by means of ion chromatography in accordance with DIN EN 14911:1999, the values for the hydrogen carbonate concentration by means of titrimetry in accordance with DIN 38409-H7:2005. The theoretical values are $Ca^{2+}:Mg^{2+}:HCO_3^-=1:1:4$, the measured values for $Ca^{2+}:Mg^{2+}:HCO_3^-=1.0:1.4:4.6$. The magnesium oxide component consequently reacted somewhat faster than the calcium carbonate component. Overall, however, the measured values were in good agreement with the expected theoretical hardening values.

The turbidity of the treated water was checked by means of nephelometry at regular intervals of about 2 weeks. The turbidity of the treated water was tested in accordance with DIN EN ISO 7027:2000. In most of the measurements, the treated water had a very low turbidity of less than 0.1 NTU. The turbidity limit of the drinking water ordinance of 1 NTU was not exceeded in any of the measurements.

The raw water treated with the inventive filter material consequently met the quality requirements according to the Drinking Water Ordinance. The inventive filter material is therefore extremely well suited for the treatment of drinking water, in particular for the deacidification and/or remineralization of drinking water.

The invention claimed is:

1. A filter material for water treatment comprising:
a first granulate containing calcium carbonate; and
a second granulate containing magnesium oxide,
wherein the first and the second granulate each independently have a respective bulk density of 1.00 to 1.40 $t/m^3$, and wherein the respective bulk density of the first granulate differs from the respective bulk density of the second granulate by at most 10%.

2. The filter material according to claim 1, wherein the first and/or the second granulate each independently has a bulk density of 1.10 to 1.38 $t/m^3$.

3. The filter material according to claim 1, wherein the filter material contains the first granulate in an amount of 55 to 85% by weight based on the sum of the amounts of the first and the second granulate.

4. The filter material according to claim 1, wherein the first granulate contains calcium carbonate in an amount of at least 90% by weight based on the total dry weight of the first granulate.

5. The filter material according to claim 1, wherein the second granulate contains magnesium oxide in an amount of at least 80% by weight based on the total dry weight of the second granulate.

6. The filter material according to claim 1, wherein the first granulate contains magnesium oxide in an amount of at most 1% by weight based on the total dry weight of the first granulate, and/or the second granulate contains calcium carbonate in an amount of at most 3% by weight based on the total dry weight of the second granulate.

7. The filter material according to claim 1, wherein the first and the second granulate are each independently a substantially spherical granulate.

8. The filter material according to claim 1, wherein the first granulate has a particle size range of 0.01 to 8 mm, with an undersize percentage of less than 10% by weight, and with an oversize percentage of less than 10% by weight.

9. The filter material according to claim 1, wherein the second granulate has a particle size range of 0.01 to 12 mm, with an undersize percentage of less than 10% by weight, and with an oversize percentage of less than 10% by weight.

10. A filter material for water treatment comprising:
55 to 85% by weight of a first granulate containing calcium carbonate; and
15-45% by weight of a second granulate containing magnesium oxide, in each case based on the sum of the amounts of the first and the second granulate,
wherein the first granulate contains calcium carbonate in an amount of at least 90% by weight based on the total dry weight of the first granulate, and wherein the second granulate contains magnesium oxide in an amount of at least 80% by weight based on the total dry weight of the second granulate;
Wherein the first and the second granulate each independently have a respective bulk density of 1.00 to 1.40 $t/m^3$, and wherein the respective bulk density of the first granulate differs from the respective bulk density of the second granulate by at most 10%.

11. A filter comprising the filter material according to claim 1.

12. The filter according to claim 11, wherein the filter comprises at least a first and a second layer, wherein the first layer comprises a filler material and the second layer comprises the filter material.

13. The filter according to claim 12, wherein the filler material is selected from supporting gravel, sand, kieselgur, silica gel, molecular sieve, zeolite, cellulose, cellulose derivatives, carbon fibers, ceramic, synthetic resin, rock flour, glass fiber, silicates, glass spheres and mixtures thereof and/or in that the filler material has a particle size range of 0.1 to 12 mm, with an undersize percentage of less than 15% by weight, and an oversize percentage of less than 15% by weight.

14. The filter according to claim 11, wherein the filter has a diameter of 100 to 3500 mm and/or a height of 500 to 10000 mm.

15. A method for treating water, comprising:
(a) providing a filter containing a filter material which comprises a first granulate containing calcium carbonate and a second granulate containing magnesium oxide, wherein the first and the second granulate each independently have a respective bulk density of 1.00 to 1.40 t/, and wherein the respective bulk density of the first granulate differs from the respective bulk density of the second granulate by at most 10%;
(b) introducing water into the filter;
(c) bringing the introduced water into contact with the filter material; and
(d) removing the water previously brought into contact with the filter material from the filter.

* * * * *